United States Patent [19]
Tamaru et al.

[11] Patent Number: 5,645,769
[45] Date of Patent: Jul. 8, 1997

[54] HUMIDIFIED COOL WIND SYSTEM FOR VEHICLES

[75] Inventors: Makoto Tamaru, Kariya; Kazuhiko Nakagawa, Chita-gun; Shouichi Yamaguchi, Kariya, all of Japan

[73] Assignee: Nippondenso Co., Ltd., Kariya, Japan

[21] Appl. No.: 491,090

[22] Filed: Jun. 16, 1995

[30] Foreign Application Priority Data

Jun. 17, 1994 [JP] Japan ................................... 6-135401
Oct. 19, 1994 [JP] Japan ................................... 6-253648

[51] Int. Cl.$^6$ ........................................................ B01F 3/04
[52] U.S. Cl. ........................ 261/30; 261/81; 261/DIG. 4; 261/DIG. 48
[58] Field of Search ..................... 261/DIG. 4, DIG. 48, 261/30, 81

[56] References Cited

U.S. PATENT DOCUMENTS

| 2,277,552 | 3/1942 | Kneedler | 261/DIG. 4 |
|---|---|---|---|
| 2,970,456 | 2/1961 | Rice | 261/DIG. 4 |
| 3,867,486 | 2/1975 | Nagele | 261/DIG. 4 |
| 4,238,425 | 12/1980 | Matsuoka et al. | 261/81 |
| 4,261,930 | 4/1981 | Walker | 261/DIG. 4 |
| 4,500,479 | 2/1985 | Fukami et al. | 261/DIG. 4 |
| 4,798,060 | 1/1989 | Long et al. | |
| 5,112,535 | 5/1992 | Roberson | 261/DIG. 4 |

FOREIGN PATENT DOCUMENTS

| 4201618 | 7/1992 | Japan . |
|---|---|---|
| 6115347 | 4/1994 | Japan . |

*Primary Examiner*—Tim R. Miles
*Attorney, Agent, or Firm*—Cushman, Darby & Cushman IP Group of Pillsbury Madison & Sutro LLP

[57] ABSTRACT

The vehicular humidified cool wind system includes a blower, atomizing means, a water tank and an air passage which are integrated, and is mounted on the ceiling above the driver to blow out a humidified wind downward. The air passage is divided into a humidified wind passage to be fed with atomized water and an ordinary wind to be fed with no atomized water. The air outlet has a double duct structure, an internal cylinder and external cylinder, in which the humidified wind having passed through the humidified wind passage is blown out of an internal cylinder whereas the ordinary wind having passed through the ordinary wind passage is blown out of an external cylinder around the internal cylinder. The humidified wind is prevented from diffusing while being surrounded by the ordinary wind, so that it efficiently reaches the driver to give him a cool feeling.

10 Claims, 17 Drawing Sheets

HUMIDIFIED COOL WIND SYSTEM FOR VEHICLES

CROSS REFERENCE TO RELATED APPLICATION

This application is based upon and claims priority from Japanese Patent Application No. 6-135401 filed Jun. 17, 1994 and Japanese Patent Application No. 6-253648 filed Oct. 19, 1994, with the contents of each document being incorporated herein by reference.

BACKGROUND OF THE INVENTION

1. Field of the Invention

The present invention relates to a vehicular humidified cool wind system for giving a driver a cool feeling with atomized water and, more particularly, to a technique suitable if applied to a working car of open cabin type such as a fork lift truck, a tractor, a crane truck or a bulldozer.

2. Description of the Related Art

As a technique for giving a driver a cool feeling with the atomized water, a humidifier is disclosed in Japanese Patent Application Laid-Open No. Hei 4-201618/1992. This humidifier is mounted on the internal wall of the door of the vehicle below the window to blow the atomized water toward the face of the driver thereby to give the driver proper humidity on the spot.

The humidified wind blown from the humidifier toward the face of the driver absorbs the heat of the surrounding wind with the atomized water mixed therein, so that the driver may be given a cool feeling with the cooled wind. If, however, the humidified cool wind system has its air outlet spaced at a long distance from the face of the driver, the cool wind will disperse to the surrounding atmosphere. This makes it desirable that the air outlet of the humidified cool wind system for blowing out the atomized water is disposed within a short distance from the driver's face.

In the technique disclosed in the above cited Japanese Patent Application Laid-Open, however, the distance between the air outlet and the driver's face is relatively long, the wind, which has been blown out of the air outlet and cooled down through the evaporation of the atomized water, disperses to the surrounding atmosphere before it reaches the driver, so that it cannot give the driver a sufficiently cool feeling. Incidentally, if the water content in the atomized water is increased, the atomized water bonds in the air so that the water droplets are produced.

In the technique disclosed in the above described Japanese Patent Application Laid-Open, moreover, there is disclosed an example in which the humidified cool wind system is mounted on the internal wall of the door below the window. As a matter of fact, the mounting of the humidified cool wind system on the internal wall below the window oppresses the driver too impractically.

SUMMARY OF THE INVENTION

The present invention has been conceived in view of the background described above and has an object to provide a vehicular humidified cool wind system which has such a short distance between the air outlet and the driver's face as to give the driver a sufficiently cool feeling.

The following technical means are adopted in the vehicular humidified cool wind system of the present invention.

In one preferred mode of the present invention, a humidified cool wind system for a vehicle includes: an air passage arranged over a driver for passing air therethrough, the air passage having a downward air outlet for blowing out the air from above the driver toward the driver; a blower for producing an air flow from the air outlet toward the driver; and atomizing means for atomizing water to produce the atomized water in the air passage.

In another preferred mode of the humidified cool wind system for a vehicle, the air passage includes a humidified wind passage to be fed with the air and the atomized water atomized by the atomizing means and an ordinary wind passage to be fed with an ordinary wind containing no atomized water, the air outlet includes an internal cylinder for blowing out the humidified wind passing through the humidified wind passage and an external cylinder for blowing out the ordinary wind passing through the ordinary wind passage from around the internal cylinder.

In further preferred mode of the humidified cool wind system for a vehicle, the system further includes evaporating members arranged around the internal cylinder, having communication with the internal cylinder for absorbing condensed water in the internal cylinder to evaporate the absorbed condensed water with the ordinary wind flowing in the external cylinder.

[Operation and Effects of Claim 1]

When the atomizing means is activated as the blower is activated, an air flow directed downward to the driver is established in the air passage, and the atomized water is mixed into the downward air flow. As a result, the humidified wind containing the atomized water is blown out toward the driver from the downward air outlet which is disposed above the driver. Incidentally, the atomized water in the humidified wind absorbs the heat from the surrounding wind to lower the temperature of the humidified wind.

Here, the air outlet for blowing out the humidified wind is disposed above the driver so that the distance between the air outlet and the driver is very short. Thus, the humidified cool wind blown out of the air outlet reaches the driver before it diffuses into the atmospheric air. As a result, the driver can be given a cooler feeling than that of the prior art.

Since, moreover, the air passage including the air outlet is arranged above the driver, the driver receives no sense of oppression, and the maneuvering of the vehicle is not obstructed.

The humidified wind is enabled to reach the driver while being surrounded by the ordinary wind, by blowing it out of the internal cylinder and by blowing the ordinary wind out of the external cylinder around the internal cylinder. Thus, the humidified wind having a lower temperature can be prevented from dispersing to the atmosphere before it reaches the driver, so that it can efficiently cool the driver. As a result, the driver can be efficiently given the cool feeling.

Since the air containing the atomized water flows through the internal cylinder, the atomized water may be condensed to flow downward through the internal cylinder. The condensed water flowing on the internal cylinder is absorbed by the evaporating members which are arranged around the internal cylinder. The condensed water thus absorbed by the evaporating members is evaporated by the ordinary wind flowing in the external cylinder until it is entrained by the ordinary wind toward the driver.

Thus, the condensed water to be produced in the internal cylinder is absorbed by the evaporating members and is evaporated in the external cylinder so that no condensed water will drop from the internal cylinder. Since, moreover, no condensed water drops from the air exit, there arises no trouble that the driver is uncomfortable by the condensed water wetting the driver.

DETAILED DESCRIPTION OF THE PREFERRED EMBODIMENTS

A humidified cool wind system for a vehicle according to the present invention will be described in the following in connection with an embodiment with reference to the accompanying drawings.

Figure 1:
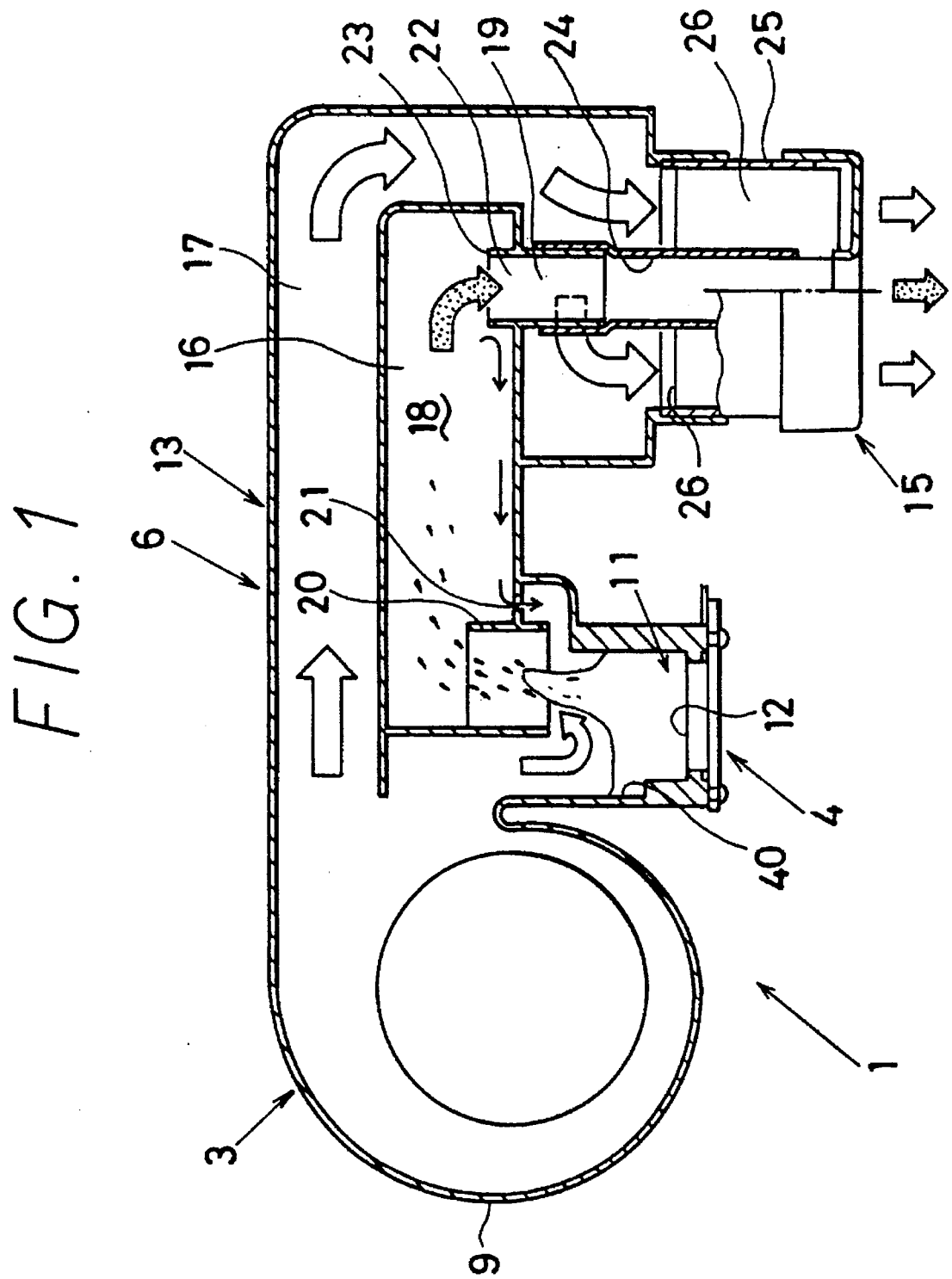
FIG. 1 is a sectional side view of a vehicular humidified cool wind system in the first embodiment.
Figure 2:
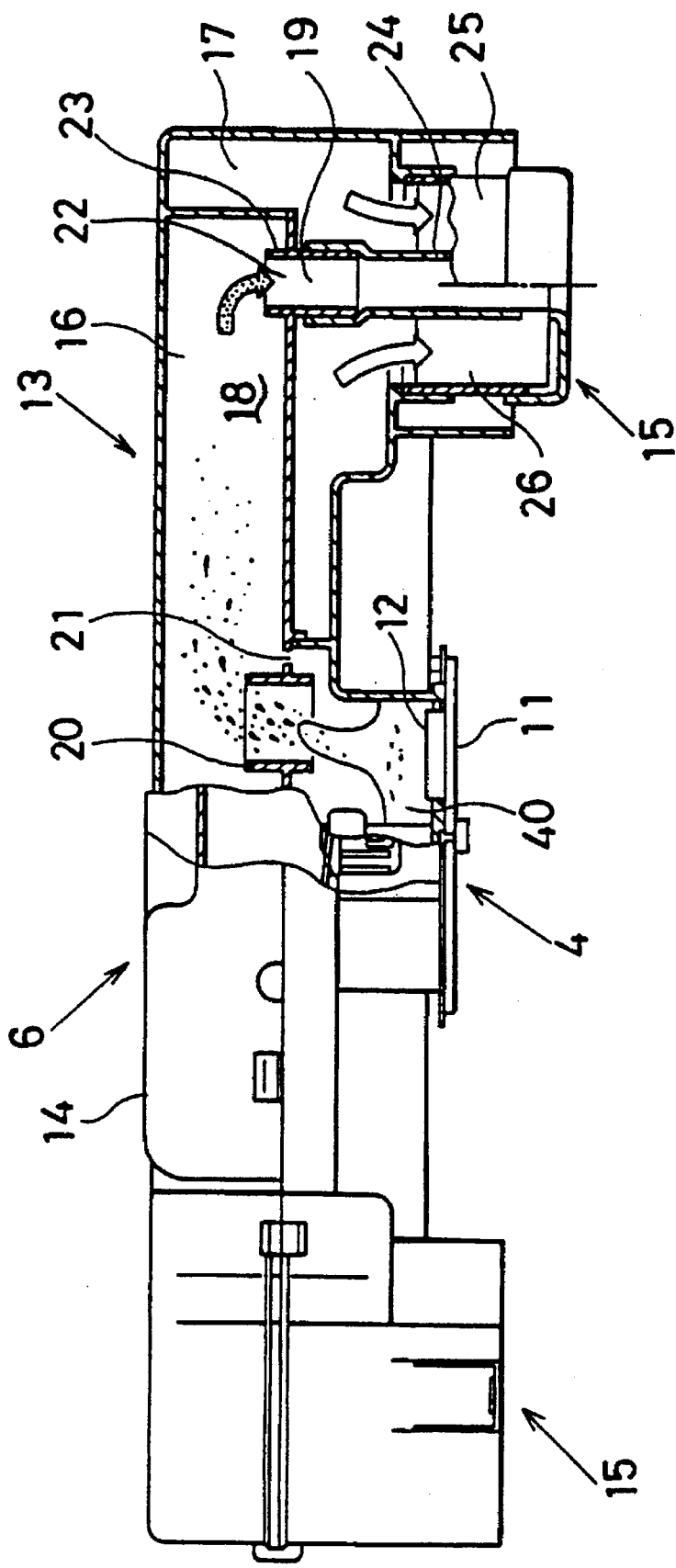
FIG. 2 is a sectional front view of a vehicular humidified cool wind system in the first embodiment.
Figure 3:
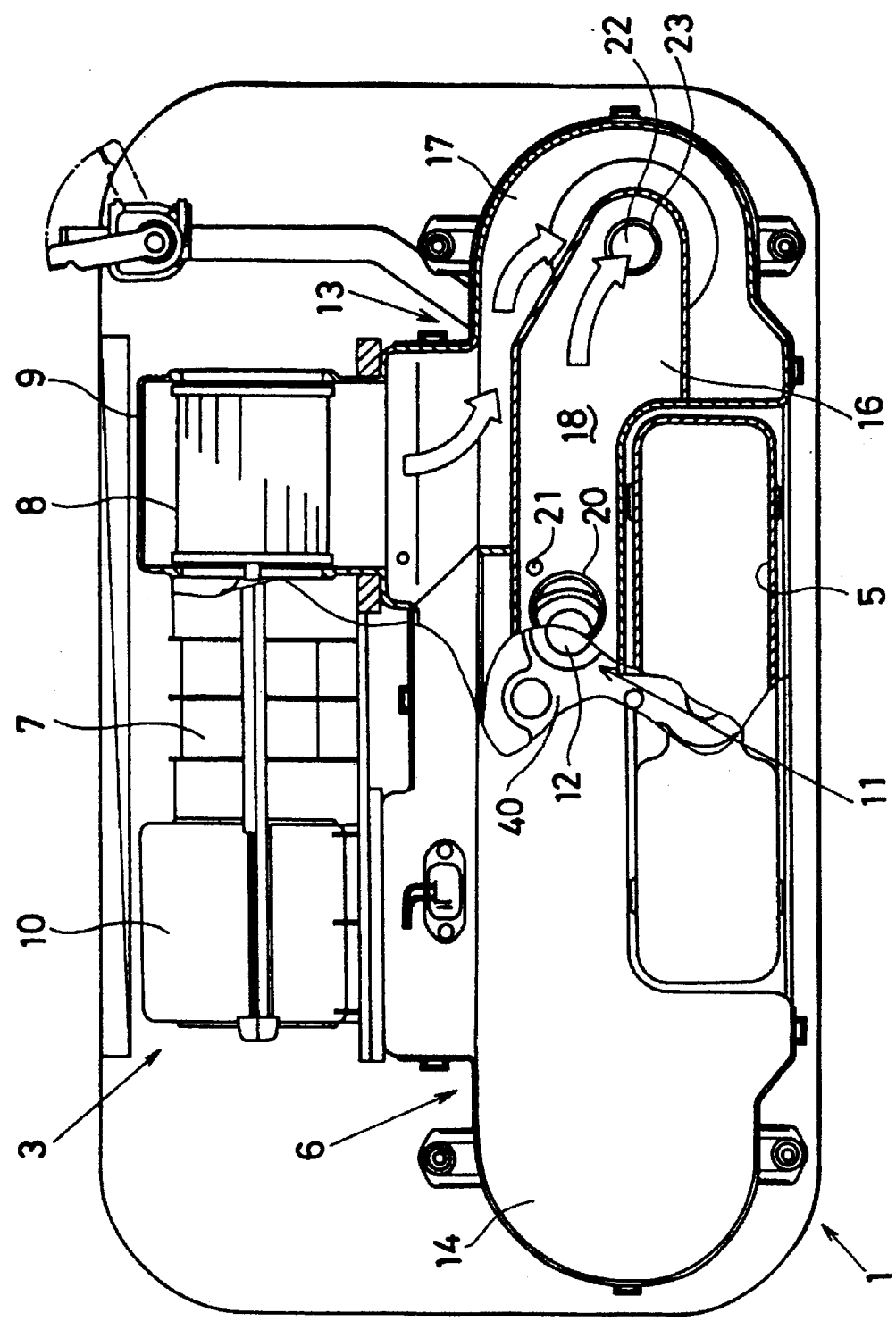
FIG. 3 is a sectional top view of a vehicular humidified cool wind system in the first embodiment.
Figure 4:
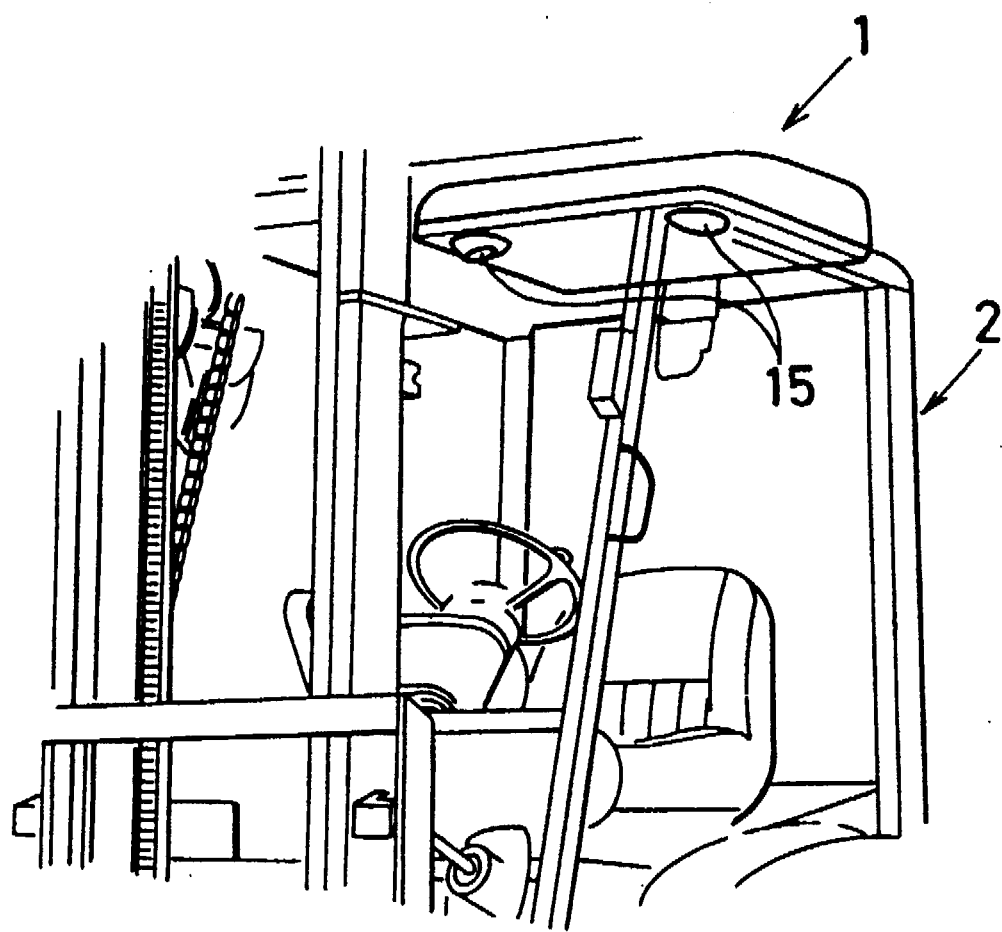
FIG. 4 is an explanatory diagram showing the state in which the vehicular humidified cool wind system is mounted in the first embodiment.

In FIGS. 1 to 22 showing the embodiment of the present invention, FIGS. 1 to 3 are sections of a humidified cool wind system for a vehicle, and FIG. 4 is an explanatory diagram showing the state in which the vehicular humidified cool wind system is mounted.

The vehicular humidified cool wind system 1 is of the integrated package type in which it is mounted in the ceiling portion of a working car 2 such as a fork lift truck, as shown in FIG. 4, and is constructed mainly of a blower 3 for establishing an air flow, atomizing means 4 for atomizing water to generate the atomized water, a water supply tank 5 for supplying the water to the atomizing means 4, and an air passage 6 for guiding the air flow of the blower 3 and the atomized water toward the driver seated inbetween, as shown in FIGS. 1 to 3.

The blower 3 of the present embodiment is a double type axial blower composed, as shown in FIGS. 1 to 3, of a motor 7 for rotating the shaft when energized, a lefthand centrifugal fan 8 and a (not-shown) righthand centrifugal fan individually fixed on the shafts extending from the two sides of the motor 7, and a lefthand scroll casing 9 and a righthand scroll casing 10 covering the lefthand centrifugal fan 8 and the righthand centrifugal fan for guiding the air flows individually established by the centrifugal fans into a lefthand air passage 13 and a righthand air passage 14, as will be described hereinafter.

The atomizing means 4 of the present embodiment is equipped in the later-described lefthand air passage 13 and the righthand air passage 14, respectively, with a lefthand ultrasonic atomizer 11 and a (not-shown) righthand ultrasonic atomizer for feeding the atomized water independently of each other. The lefthand ultrasonic atomizer 11 is equipped with a humidifying water reservoir 40 supplied with the water from the water supply tank 5 having a predetermined capacity to have its water level held at a predetermined level, and an ultrasonic oscillator 12 focused to the vicinity of the water level of the humidified water reservoir 40 to generate ultrasonic waves. This ultrasonic oscillator 12 is made of a thin disc of an electrostrictive oscillator by baking electrodes on the two sides of a piezoelectric element of barium titanate, for example, to generate ultrasonic oscillations in response to an electric signal coming from the ultrasonic wave generating circuit (not-shown).

Incidentally, the righthand ultrasonic atomizer (not-shown) adopts the same construction as that of the lefthand ultrasonic atomizer.

The air passage of the present embodiment is equipped with the lefthand air passage 13 for guiding the air flow fed from the blower 3 to a position before and above the lefthand side of the face of the driver and the righthand air passage 14 for guiding the same to a position before and above the righthand side of the driver's face. Moreover, the lefthand and righthand air passages 13 and 14 are individually formed with air outlets 15 at their downstream ends. Incidentally, the air outlet 15 at the downstream end of the lefthand air passage 13 blows the air from the lefthand upper position of the driver toward the lefthand face of the driver whereas the air outlet 15 at the downstream end of the righthand air passage 14 blows the air from the righthand upper position of the driver toward the righthand face of the driver.

The righthand air passage 14 is divided into a humidified air passage 16 supplied with the atomized water produced by the atomizing means 4 and an ordinary wind passage 17 supplied with no atomized water. Moreover, the humidified wind passage 16 is composed of an atomizing chamber 18 for guiding the humidified wind in a horizontal direction and a downward guide passage 19 for guiding the same from the atomizing chamber 18 into an internal cylinder 24, as located below the former (as will be described hereinafter).

The atomizing chamber 18 is arranged in its upstream lower portion with the atomizing means 4 for supplying the atomized water into the atomizing chamber 18 and in its upstream bottom with a cylindrical portion 20 surrounding the atomized water column produced by the atomizing means 4. Adjacent to the cylindrical portion 20, there is formed a return hole 21 for returning the dew condensation water, if any in the atomizing chamber 18, to the atomizing means 4.

On the other hand, the atomizing chamber 18 is formed in its downstream bottom with an opening 22 for guiding the humidified wind from the atomizing chamber 18 into the downward guide passage 19. Around the opening 22, there is formed a weir 23 which is raised from the bottom of the atomizing chamber 18 for preventing the condensed water, as condensed in the atomizing chamber 18, from being guided into the downward guide passage 19. The weir 23 has its height set to such a level that the condensed water in the bottom of the atomizing chamber 18 may not flow into the opening 22 even if the vehicle is inclined.

Due to the weir 23 and the return hole 21 thus formed in the atomizing chamber 18, the condensed water, if condensed in the atomizing chamber 18, is not guided into the downward guide passage 19 but is returned from the return hole 21 to the atomizing means 4.

Incidentally, the righthand air passage 14 adopts the same construction as the aforementioned one of the lefthand air passage 13.

The air outlet 15 for blowing out the air having passed through the lefthand air passage 13 is arranged in the position before and above the lefthand face of the driver and at a distance of about 30 cm from the driver's face. This air outlet 15 adopts the dual duct structure which is composed of the internal cylinder 24 for blowing out the humidified wind from the downward guide passage 19 toward the lefthand face of the driver, and an external cylinder 25 for blowing out the ordinary wind having passed through the ordinary wind passage 17, from around the internal cylinder 24 toward the lefthand face of the driver.

In the present embodiment, moreover, the ratio of the draft resistance of the humidified wind passage 16 plus the internal cylinder 24 to the draft resistance of the ordinary wind passage 17 plus the external cylinder 25 is so set that the ratio (Vs/Vt) of the flow velocity Vs of the humidified wind blown out of the internal cylinder 24 and the flow velocity Vt of the ordinary wind blown out of the external cylinder 25, is confined within a range of 1 to 3.

Figure 5:
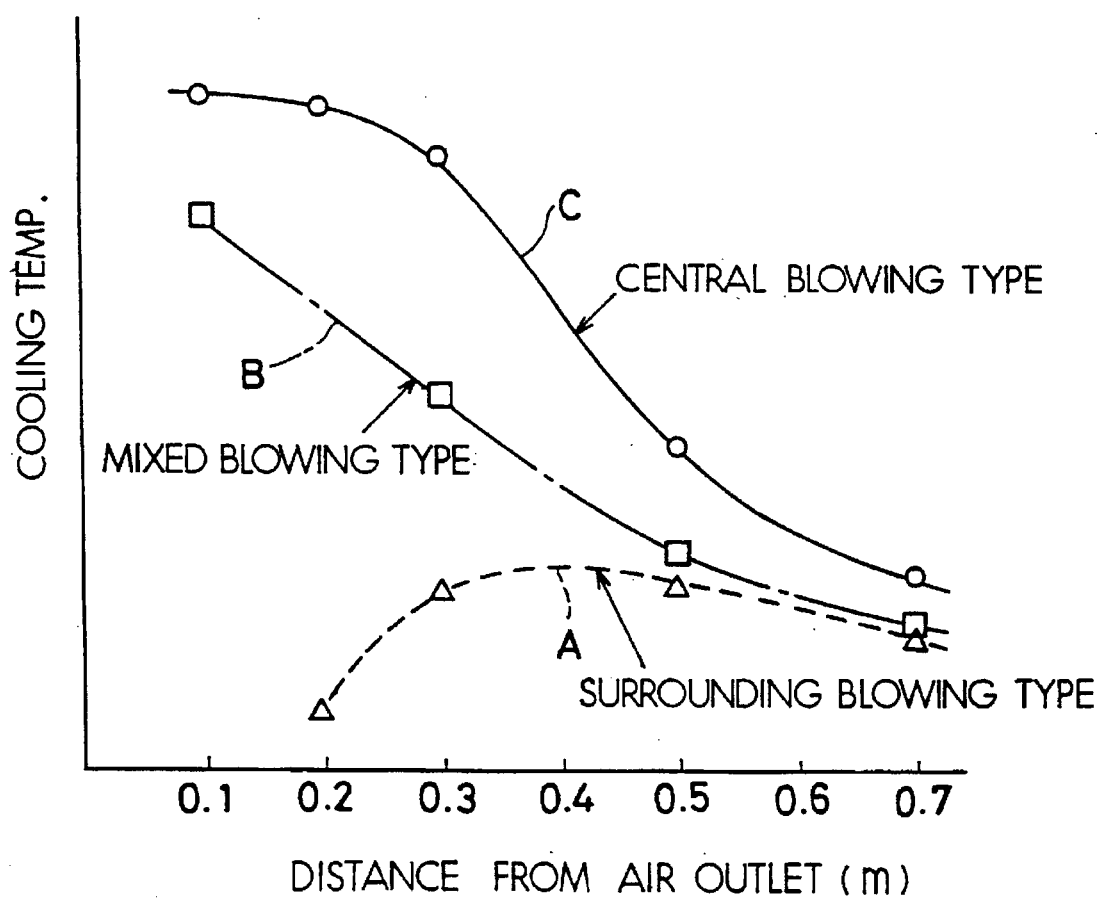
FIG. 5 is a comparative graph comparing a central blowing type, a mixed blowing type and a surrounding blowing type in the first embodiment.

With reference to FIG. 5, here will be described the reason why the humidified wind is blown out of the internal cylinder 24 whereas the ordinary wind is blown out of the external cylinder 25.

First of all, in the case (of the surrounding blowing type), in which the ordinary wind is blown out of the internal cylinder 24 whereas the humidified wind is blown out of the surrounding external cylinder 25, as contrary to the present embodiment, the cooling capacity by the humidified wind is still low, as indicated by a broken curve A in FIG. 5, even if the distance from the air outlet 15 to the driver changes. In the case (of the mixed blowing type), on the other hand, in which the isolation by the internal cylinder 24 and the external cylinder 25 is eliminated so that the wind containing the humidified wind is blown out from the common air outlet, the cooling capacity by the humidified wind grows the lower for the longer distance from the air outlet 15 to the driver, as indicated by a single-dotted curve B in FIG. 5.

In the case (of the central blowing type), on the contrary, in which the humidified wind is blown out of the central cylinder 24 whereas the ordinary wind is blown out of the surrounding external cylinder 25, as adopted in the present embodiment, the propagation of the cooling wind is the most excellent, and the cooling capacity by the humidified wind is higher than that of the other blowing types, as indicated by a solid curve C in FIG. 5. This cooling capacity by the humidified wind is extremely high within a range in which the distance from the air outlet 15 to the driver is below about 30 cm.

Therefore, the present embodiment adopts the central blowing type, in which the cooling capacity (or the propagation of the cooling wind) by the humidified wind is the most excellent.

With reference to FIG. 1, moreover, here will be described the reason why the ratio (Vs/Vt) of the flow velocity Vs of the humidified wind to the flow velocity Vt of the ordinary wind is set within the range of 1 to 3.

Figure 6:
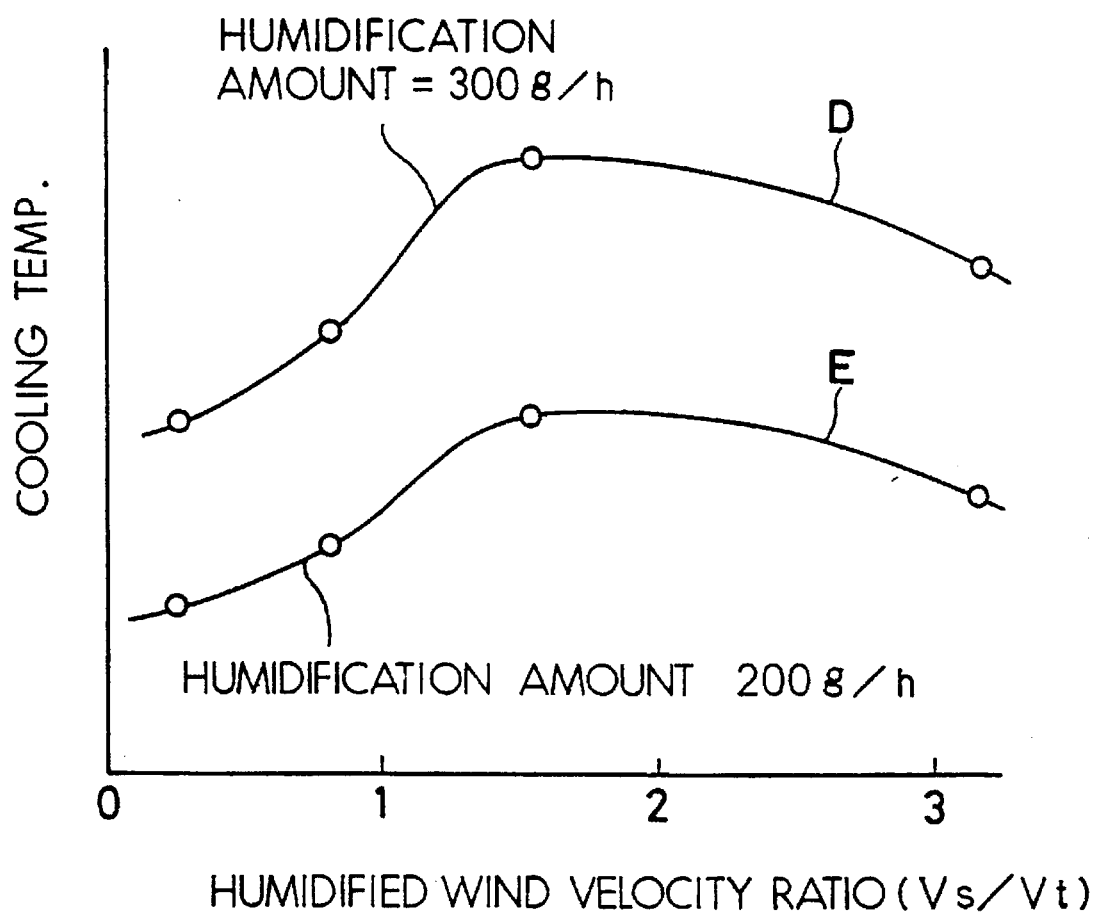
FIG. 6 is a comparative graph presenting change in the reaching efficiency of a humidified wind against the change in the flow velocity ratio of the ordinary wind and the humidified wind in the first embodiment.
Figure 7:
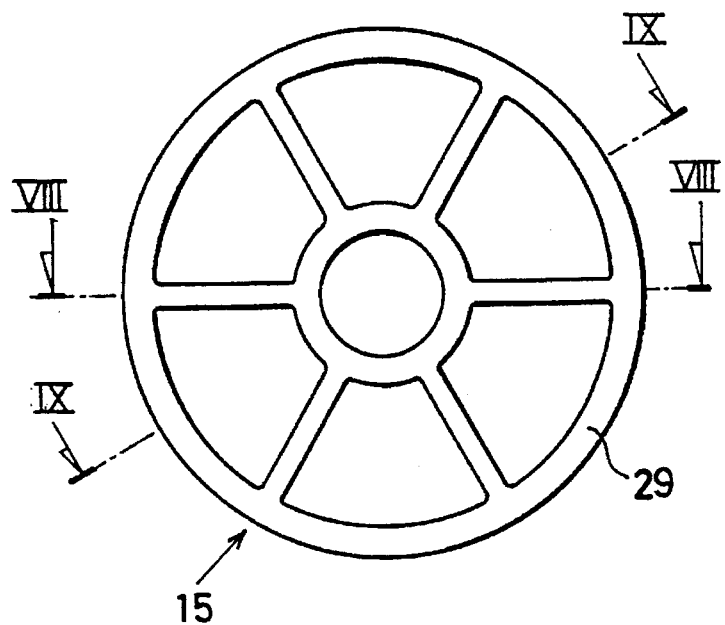
FIG. 7 is a bottom view of an air outlet in the first embodiment.
Figure 8:
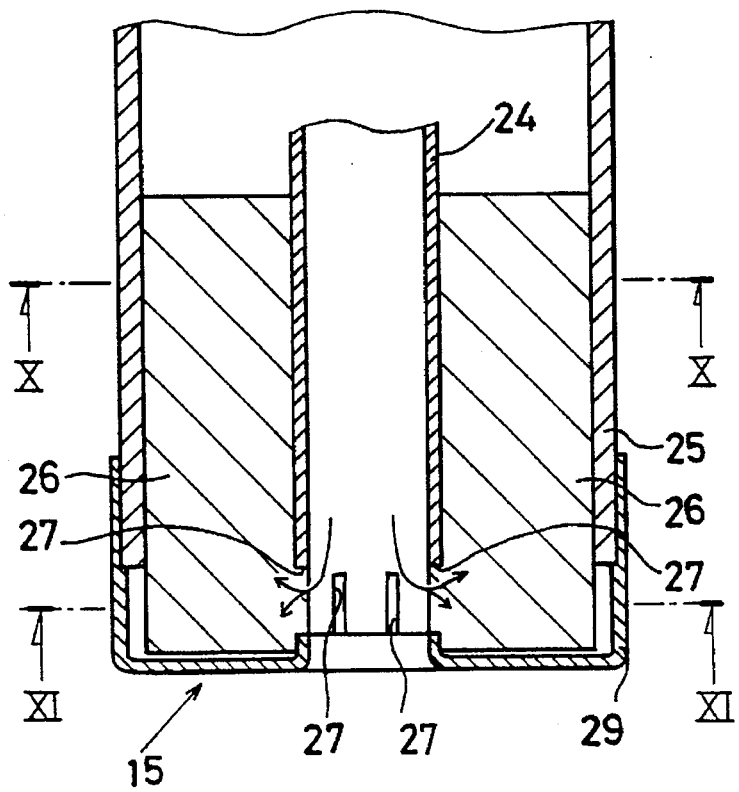
FIG. 8 is a sectional view taken along line VIII—VIII of FIG. 7.
Figure 9:
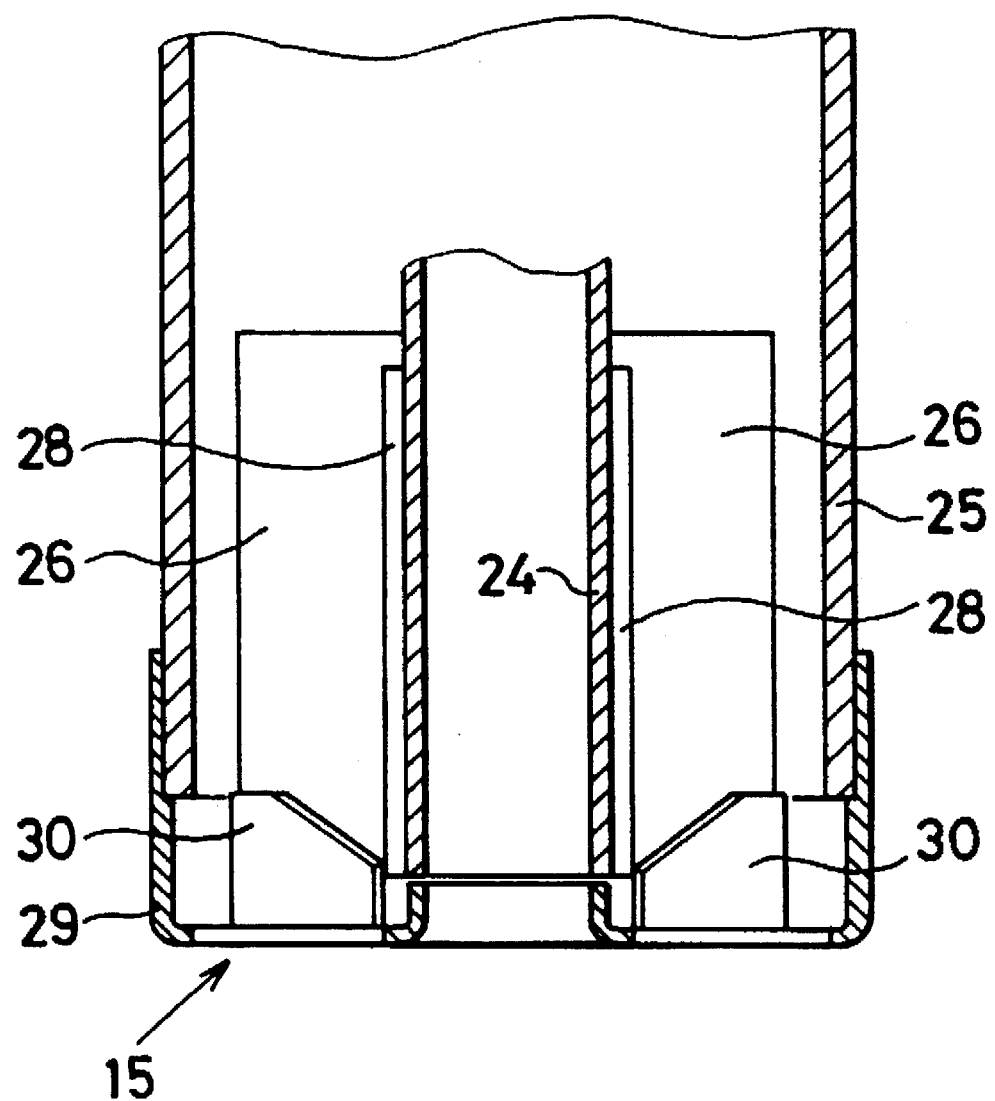
FIG. 9 is a sectional view taken along line IX—IX of FIG. 7.
Figure 10:
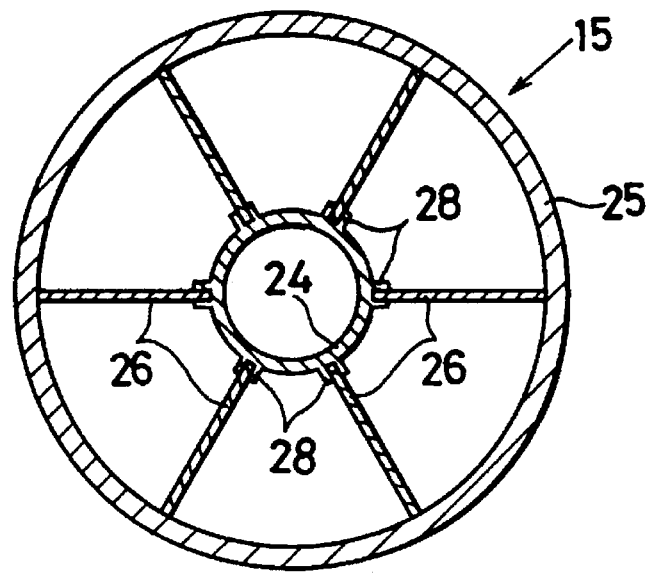
FIG. 10 is a sectional view taken along line X—X of FIG. 8.
Figure 11:
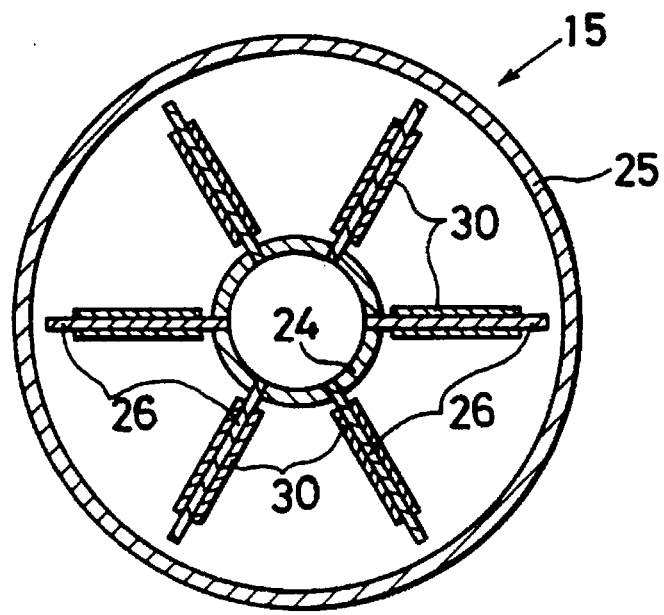
FIG. 11 is a sectional view taken along line XI—XI of FIG. 8.

In case the ratio (Vs/Vt) of the flow velocity Vs of the humidified wind to the flow velocity Vt of the ordinary wind is changed (with a constant flow rate) in the central blowing type, the humidified wind is enabled to efficiently reach the driver by setting the ratio (Vs/Vt) to the range of 1 to 3, as shown in FIG. 6. More preferably, the humidified wind can be most efficiently brought to the driver by setting the ratio (Vs/Vt) to the range of 1.3 to 2.0. This effect is substantially unvaried in the aforementioned tendency even if the ratio of humidification by the atomizing means 4 is changed (as indicated by a solid curve D for a higher humidification and by a solid curve E for a lower humidification in FIG. 6). Even if the ratio of humidification is further increased to blow the atomized water in a fog state from the internal cylinder 24, the humidified wind will naturally arrive in a spot shape at the driver.

The air outlet 15 is arranged around the internal cylinder 24 and inside of the external cylinder 25, as shown in FIGS. 7 to 11, with radial evaporating members 26 which have communication with the exit end of the internal cylinder 24 for absorbing the condensed water in the internal cylinder 24. The evaporating members 26 are made of nonwoven fabric cloth or water-resisting thick paper, a flat plate which is excellent in strength has water absorbing and evaporating properties. The evaporating members 26 are fitted at their inner lower sides in notches 27 formed in the exit end of the internal cylinder 24 so that they communicate with the inside of the internal cylinder 24. These evaporating members 26 are held radially between the internal cylinder 24 and the external cylinder 25 not only in side guides 28 which are formed in the direction of the wind on the circumference of the internal cylinder 24 but also by lower guides 30 which are radially formed over an outlet ring 29 fitted on the external cylinder 25 from below the air outlet 15.

The operation of the evaporating members 26 will be described.

Since the humidified wind containing the atomized water flows in the internal cylinder 24, the atomized water comes into contact with the inner wall of the internal cylinder 24 so that dews of the atomized water is adhered in the internal cylinder 24. As the dew grows to be condensed water, it will flow down from the internal cylinder 24. The condensed water dropping in the internal cylinder 24 is absorbed through the notches 27 of the internal cylinder 24 by the evaporating members 26, as indicated by arrows in FIG. 8. Moreover, the condensed water thus absorbed by the evaporating members 26 is evaporated by the ordinary wind flowing in the external cylinder 25 so that it is entrained by the ordinary wind and blown together toward the driver.

Thus, the condensed water produced in the internal cylinder 24 is absorbed by the evaporating members 26 and evaporated in the external cylinder 25 so that it will not drop from the internal cylinder 24. Thus, no condensed water drops from the air outlet 15 so that it will neither wet nor discomfort the driver.

Incidentally, the air outlet 15 for blowing out the air having passed through the righthand air passage 14 adopts the same construction as that of the aforementioned air outlet 15 of the lefthand air passage, excepting that it is arranged before and above the righthand face of the driver and at a distance of about 30 cm from the driver's face.

Operation of Embodiment

Here will be described the operation of the aforementioned embodiment.

When the humidified cooling switch (not shown) is turned ON, the blower 3 and the atomizing means 4 are activated. The air flow established by the blower 3 is fed to the righthand air passage 14 and the lefthand air passage 13 and further to their individual humidified wind passages 16 and ordinary wind passages 17.

The air flow flowing through the humidified wind passage 16 is fed with the atomized water from the atomizing means 4 so that the humidified wind is blown from the internal cylinder 24 toward the face of the driver. On the other hand, the air flowing through the ordinary wind passage 17 is not fed with the atomized water but is blown as the ordinary wind from the external cylinder 25 around the internal cylinder 24 toward the face of the driver. In short, the ordinary wind and the humidified wind are blown toward the lefthand and righthand face sides of the driver from the two air outlets 15 which are spaced by about 30 cm before and above the lefthand and righthand face sides of the driver.

The atomized water contained in the humidified wind is evaporated while absorbing the latent heat from the surrounding wind, to lower the temperature of the humidified wind (This evaporation of the atomized water is continued till just before the driver, to suppress the temperature of the humidified wind to reach the driver). And, this humidified wind having the lowered temperature is blown, while being enclosed by the ordinary wind, in the spot shape toward the driver's face so that it can be prevented from dispersing around before it reaches to the driver and can be brought to the lefthand and righthand face sides of the driver. As a result, a high cool feeling can be given to the driver.

Effects of the Embodiment

In the present embodiment, as described above in connection with the operation, the humidified cool wind system 1 for a vehicle is mounted in the ceiling above the driver with its two air outlets 15 being opened near the lefthand and righthand face sides, so that the humidified winds having their temperatures lowered are efficiently blown from the two air outlets 15 toward the lefthand and righthand face sides of the driver. Moreover, the humidified wind is blown out of the internal cylinder 24 whereas the ordinary wind is blown out of the external cylinder 25, and the ratio (Vs/Vt) of the flow velocity Vs of the humidified wind to the flow velocity Vt of the ordinary wind is set within the range of 1 to 3, so that the humidified cool winds are efficiently blown toward the lefthand and righthand face sides of the driver. As a result, the cool feeling to be given to the driver can be enhanced, as compared with the prior art.

Due to the weir 23 disposed around the opening 22 providing the communication between the atomizing chamber 18 and the downward guide passage 19, moreover, the condensed water, if condensed in the atomizing chamber 18, is prevented from flowing through the downward guide passage 19 into the internal cylinder 24 and is returned from the return hole 21 into the atomizing means 4.

And, the condensed water, if produced in the internal cylinder 24, is absorbed by the evaporating members 26 and is evaporated by the ordinary wind flowing in the external cylinder 25 so that it will not drop from the two air outlets 15 (FIG. 4).

On the other hand, the humidified cool wind system 1 for the vehicle according to the present embodiment is of the integrated package type so that it can be easily mounted on the working car 2 such as a fork lift truck.

Moreover, the vehicular humidified cool wind system 1 is mounted in the ceiling so that it gives no sense of oppression to the driver and accordingly no obstruction against the driving operation.

Second Embodiment

Figure 12:
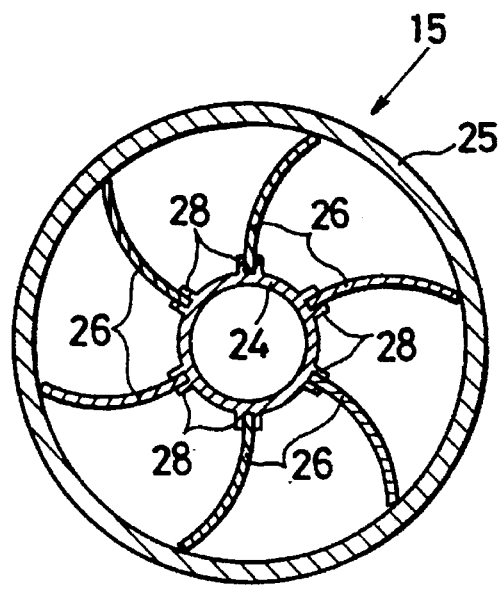
FIG. 12 is a sectional view of the air outlet in the second embodiment.

FIG. 12 is a sectional view showing the air outlet 15 according to a second embodiment.

The first embodiment is exemplified by forming the evaporating members 26 into the flat shape, but the evaporating members 26 of the present embodiment are formed to have an arcuate section thereby to enlarge their evaporation area.

Third Embodiment

Figure 13:
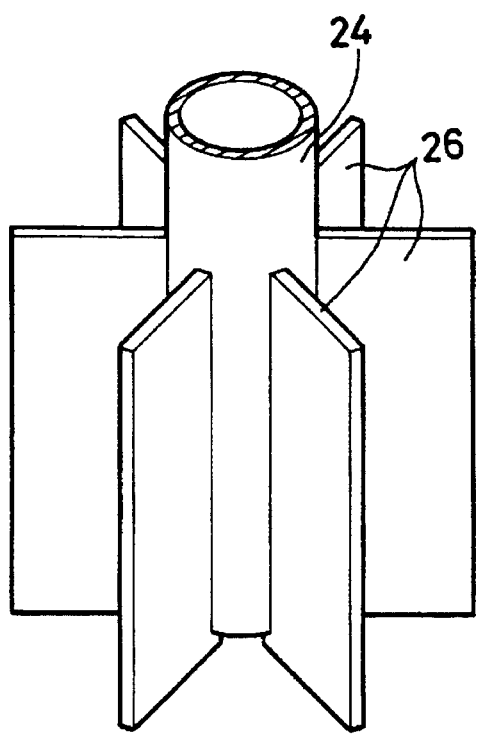
FIG. 13 is a perspective view of an internal cylinder and evaporating members in the third embodiment.

FIG. 13 is a perspective view of the internal cylinder 24 and the evaporating members 26 according to a third embodiment.

In the first embodiment and the second embodiment, the internal cylinder 24 and the evaporating members 26 are made separate, and the evaporating members 26 are fitted around the internal cylinder 24. In the present embodiment, however, the internal cylinder 24 and the evaporating members 26 are integrally molded of a strong material excellent in the water absorbing and evaporating properties. As a result, the condensed water, if produced in the internal cylinder 24, is absorbed without fail by the internal cylinder 24 and the evaporating members 26 until it is evaporated by the ordinary wind flowing through the external cylinder 25.

Fourth Embodiment

Figure 14:
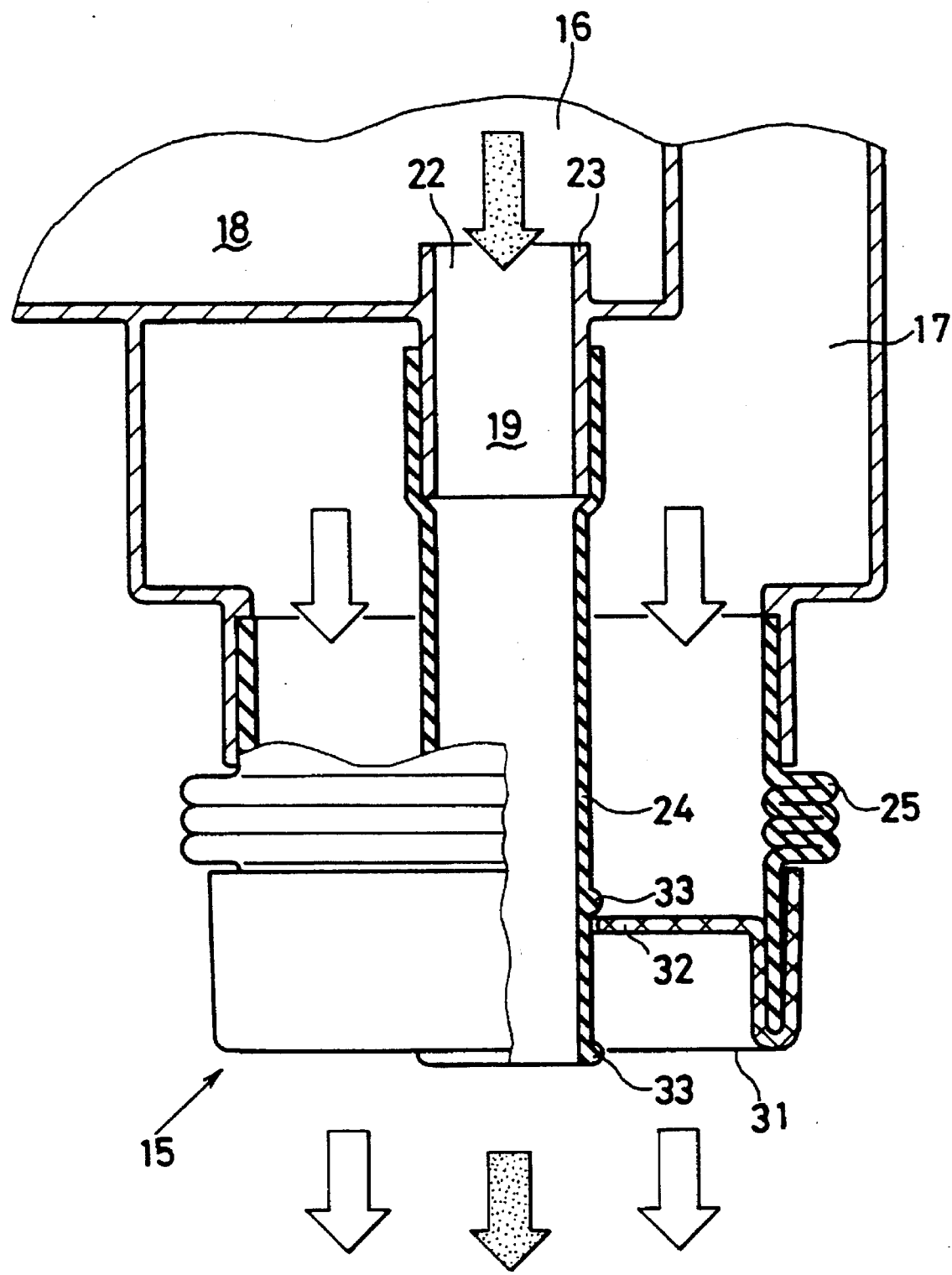
FIG. 14 is a sectional view of an air outlet in the fourth embodiment.
Figure 15:
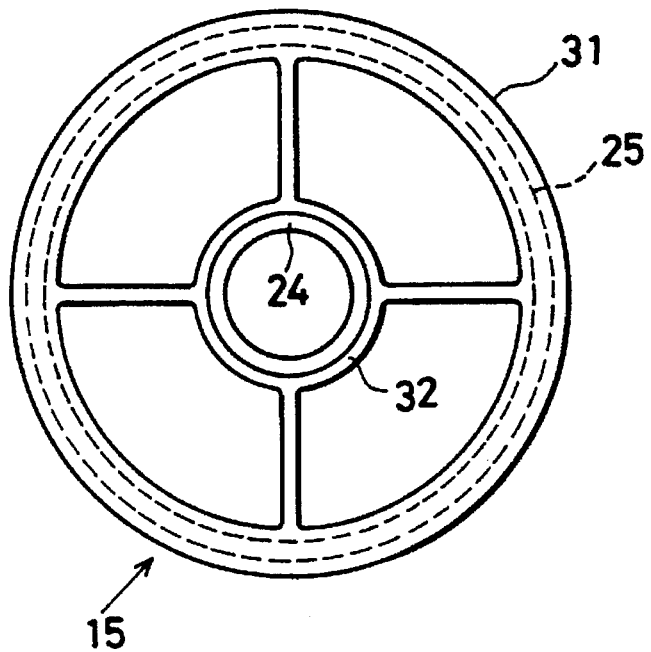
FIG. 15 is a bottom view of the air outlet in the fourth embodiment.

In FIGS. 14 and 15 showing a fourth embodiment, FIG. 14 is a sectional view of the air outlet 15, and FIG. 15 is a bottom view of the air outlet 15.

The internal cylinder 24 of the present embodiment is constructed of a flexible rubber tube which is made deformable in a normal direction with respect to the flow direction of the humidified wind. The rubber hose constructing the internal cylinder 24 has a smooth inner circumference. On the other hand, the external cylinder 25 is constructed of a flexible duct of a resin bellows, which is made deformable in the normal direction with respect to the flow direction of the ordinary wind and can hold its deformed shape.

On the outlet end of the external cylinder 25, moreover, there is fitted an outlet ring 31. In the inter circumference of this outlet ring 31, there is fitted a ring-shaped holding portion 32 for holding the circumference of the internal cylinder 24. This holding portion 32 is designed to have an internal diameter larger by about 1 mm than the external diameter of the external cylinder 25 so that it can move in the air flow direction with respect to the internal cylinder 24. Incidentally, the internal cylinder 24 of the present embodiment is formed therearound with stop rings 33 which are made diametrically larger than the internal diameter of the holding portion 32.

As in this embodiment, the internal cylinder 24 is made of the rubber hose whereas the external cylinder 25 is made of the flexible duct, and the outlet ring 31 having the holding portion 32 for holding the internal cylinder 24 is fitted on outlet end of the external cylinder 25. Thus, if the blowing direction of the external cylinder 25 is changed, the blowing direction of the internal cylinder 24 is accordingly changed through the holding portion 32. In short, by adopting the present embodiment, the blowing direction of the humidified wind and the ordinary wind can be changed according to the height of the face of the driver or to the taste of the driver.

In this embodiment, moreover, the internal cylinder 24 is made of the rubber tube and has the smooth inner circumference so that the condensed water to be produced in the internal cylinder 24 can be reduced more, as compared with the case in which the internal cylinder 24 is made of a flexible duct.

Incidentally, in the present embodiment, too, the evaporating members 26 (as in the first to third embodiments) may be disposed around the outlet end of the internal cylinder 24 to evaporate the condensed water to be condensed in the internal cylinder 24.

Fifth Embodiment

Figure 16:
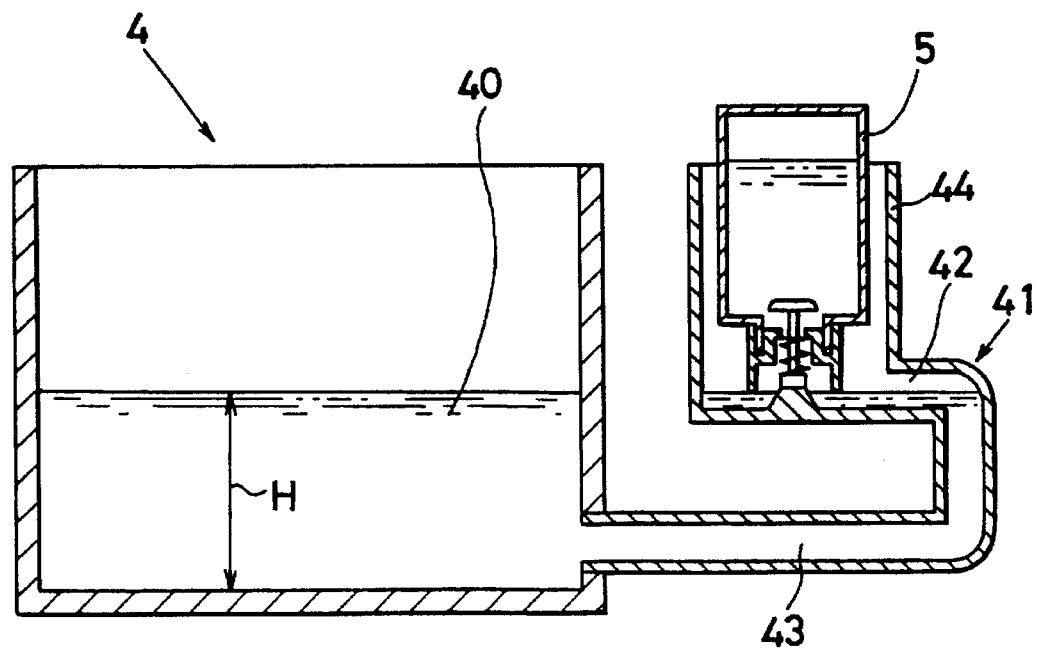
FIG. 16 is a sectional view of an essential portion of atomizing means when the vehicle is not inclined in the fifth embodiment.
Figure 17:
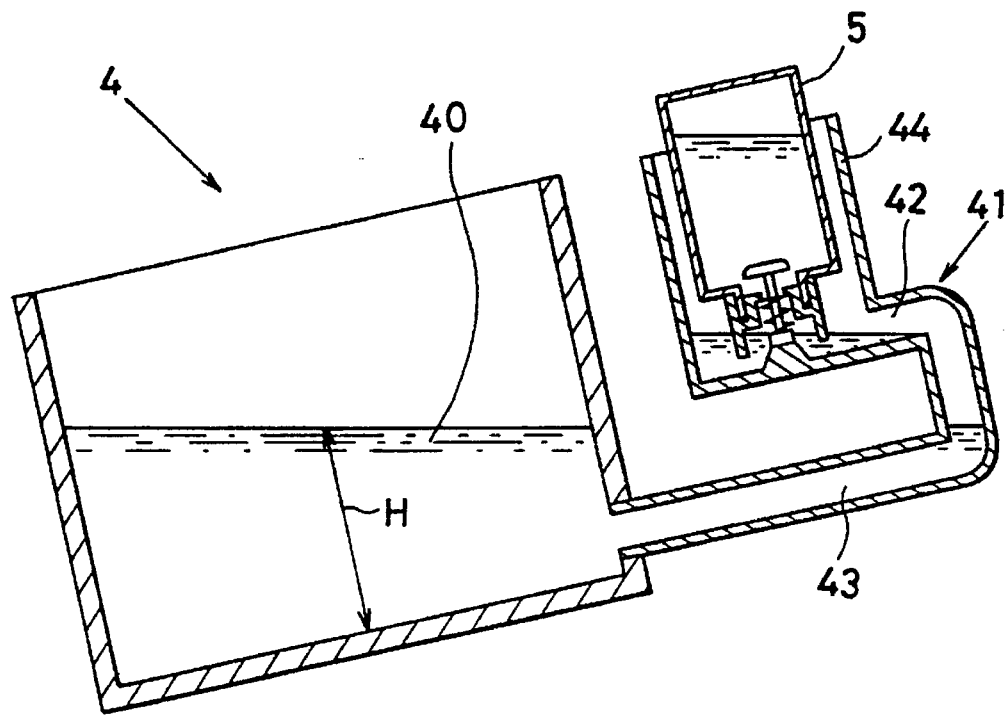
FIG. 17 is a sectional view of an essential portion of the atomizing means when the vehicle is inclined to raise a water supply tank with respect to a humidifying water reservoir in the fifth embodiment.

In FIGS. 16 and 17 showing a fifth embodiment, FIG. 16 is a sectional view of an essential portion of the atomizing means 4 when the vehicle is not inclined, and FIG. 17 is a sectional view of an essential portion of the atomizing means 4 when the vehicle is inclined so that the water supply tank 5 is lifted with respect to the humidifying water reservoir 40.

The atomizing means 4 of the present embodiment supplies the water from the water supply tank 5 to the humidifying water reservoir 40 through a turn water passage 41. This turn water passage is composed of: a backward water passage 42 for guiding the water which flows out from the water supply tank 5, in a direction away from the humidifying water reservoir 40; and a forward water passage 43 for turning the water, which has been guided by the backward water passage 42 away from the humidifying water reservoir 40, once downward and then into the humidifying water reservoir 40. Incidentally, the water supply tank 5 is surrounded by a water receiving wall 44 for guiding the water of the water supply tank 5 into the backward water passage 42.

Figure 18:
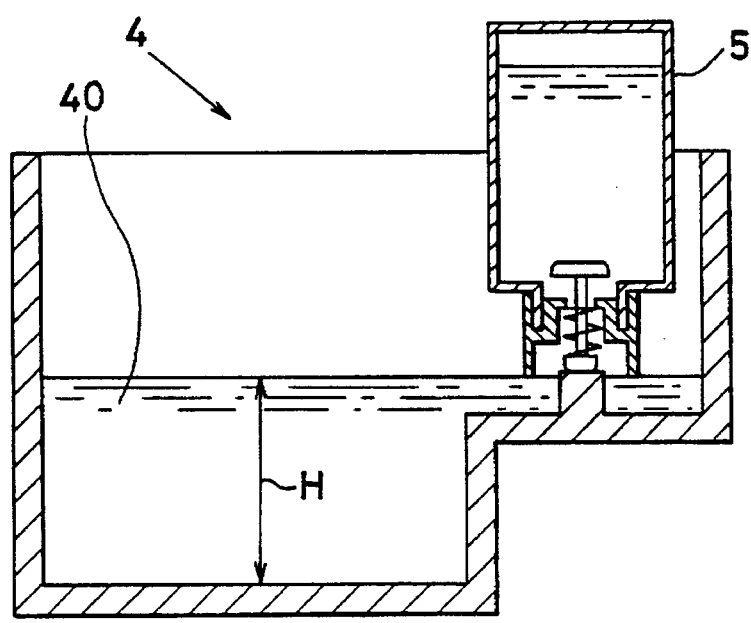
FIG. 18 is a sectional view of an essential portion of atomizing means when the vehicle is not inclined in a comparison technique.
Figure 19:
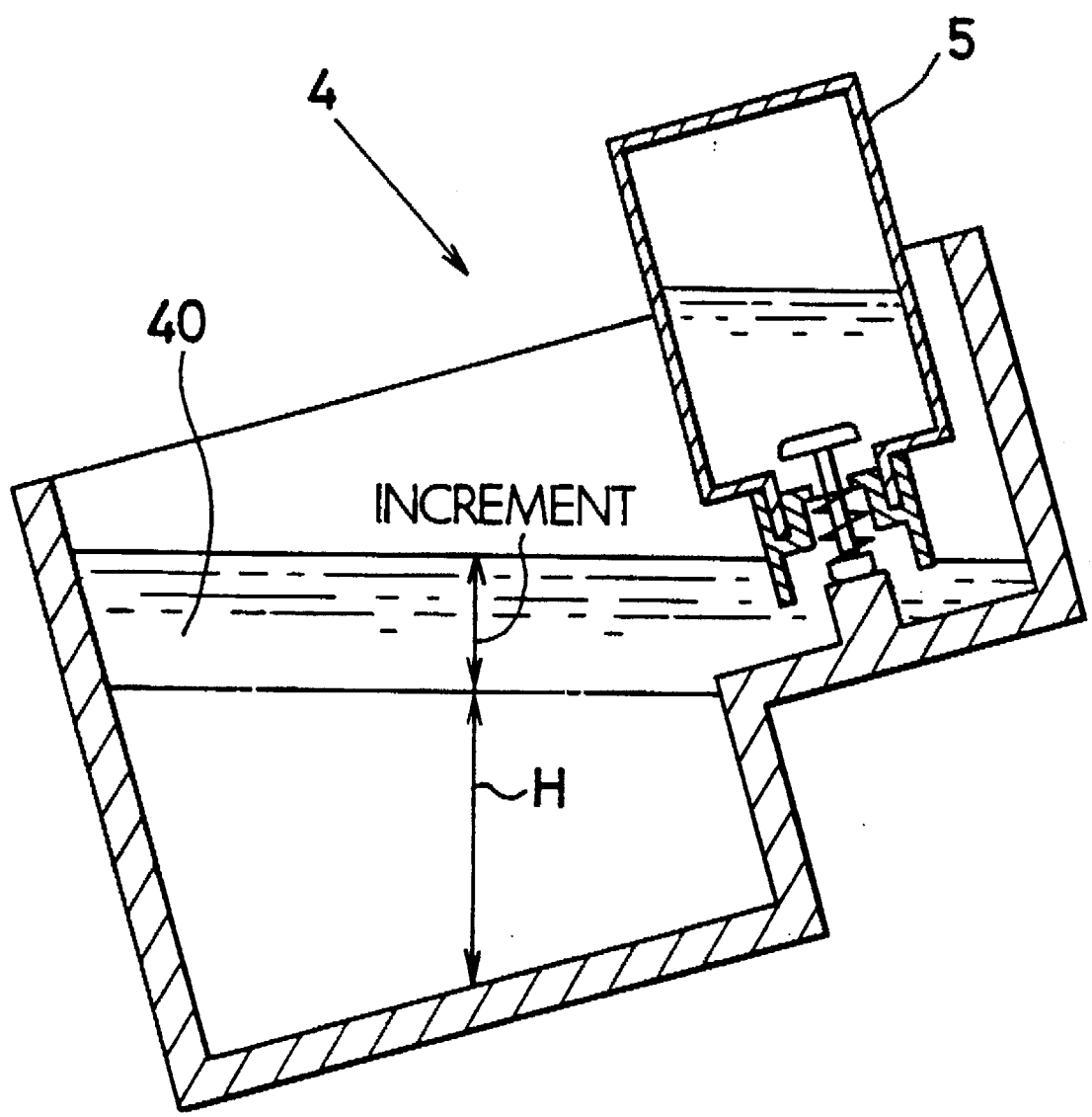
FIG. 19 is a sectional view of section of an essential portion of the atomizing means when the vehicle is inclined to raise the water supply tank with respect to the humidifying water reservoir in the comparison technique.

With reference to FIGS. 18 and 19, here will be described an example of the case in which the turn water supply passage 41 according to the present embodiment is not adopted.

The atomizing means 4, as shown in FIG. 18, guides the water flowing out of the water supply tank 5, directly into the humidifying water reservoir 40 so that the water in the humidifying water reservoir 40 takes a proper level H at the lower opening position (or the water outlet) of the water supply tank 5.

According to this atomizing means 4, the lower opening (or the water outlet) of the water supply tank 5 is moved upward with respect to the humidifying water reservoir 40, as shown in FIG. 19, when the vehicle is inclined to raise the water supply tank 5 with respect to the humidifying water reservoir 40, so that the water in the water supply tank 5 is fed into the humidifying water reservoir 40 to increase the water level in the humidifying water reservoir 40. As a result, the water in the humidifying water reservoir 40 exceeds the proper level H. When the water in the humidifying water reservoir 40 exceeds the proper level H, the ultrasonic waves to be produced by the ultrasonic oscillator (as should be referred to the first embodiment) is not focused in the proper point (as located in the vicinity of the liquid level of the humidifying water reservoir 40) so that the proper atomized water becomes difficult to generate.

If, on the contrary, the turn water supply passage 41 is used as in the present embodiment, the backward water passage 42 is raised at the side different from the humidifying water reservoir 40, as shown in FIG. 17, even when the vehicle is inclined to raise the water supply tank 5 with respect to the humidifying water reservoir 40. As a result, the water communication between the backward water passage 42 and the forward water passage 43 is interrupted, and the water in the backward water passage 42 clogs the opening of the water supply tank 5 to obstruct the flow of the water out of the water supply tank 5. In short, even if the water supply tank 5 rises with respect to the humidifying water reservoir 40, the feed of the water from the water supply tank 5 to the humidifying water reservoir 40 is obstructed.

As a result, even if the water supply tank 5 rises with respect to the humidifying water reservoir 40, the trouble of increasing the water content in the humidifying water reservoir 40 can be prevented to hold the water of the humidifying water reservoir 40 at the proper level H.

Sixth Embodiment

Figure 20:
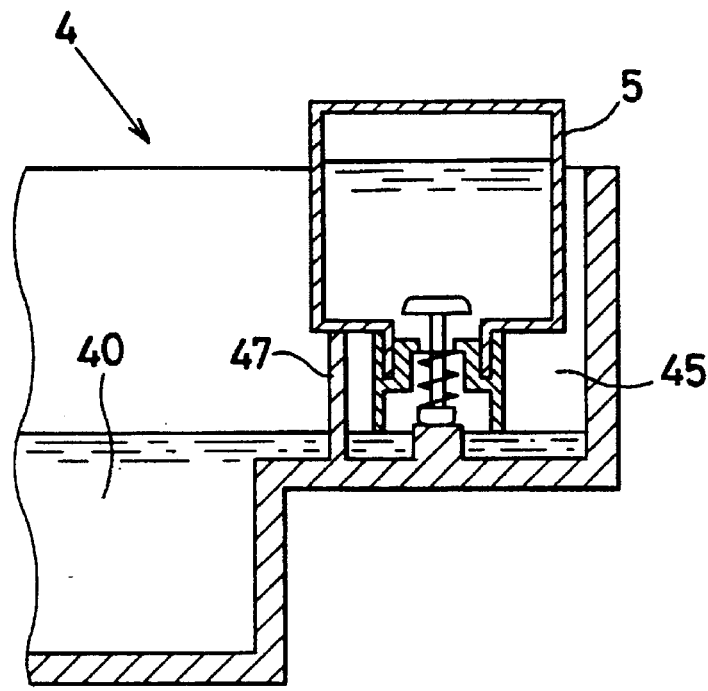
FIG. 20 is a sectional view of an essential portion of atomizing means when the vehicle is not inclined in a sixth embodiment.
Figure 21:
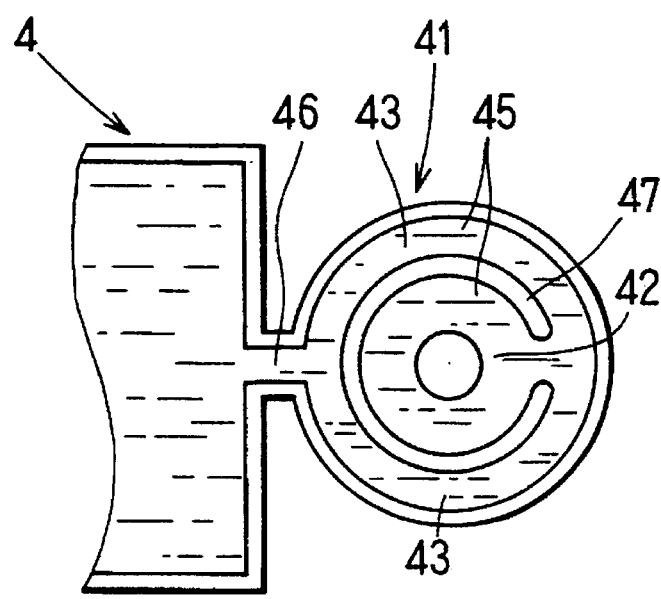
FIG. 21 is a top plan view of the state in which the water supply tank is removed in the state of FIG. 20 in the sixth embodiment.
Figure 22:
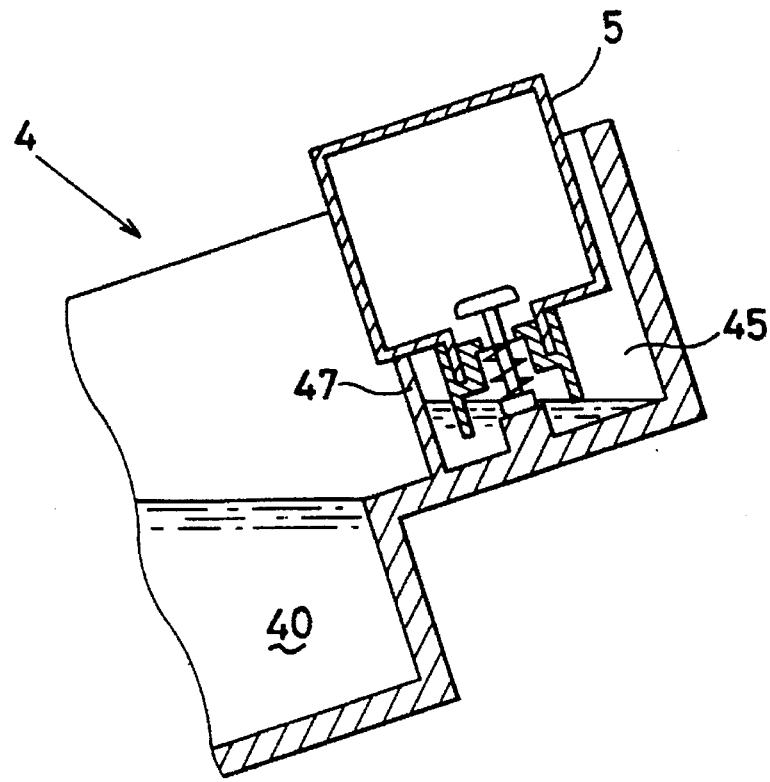
FIG. 22 is a sectional view of an essential portion of the atomizing means when the vehicle is inclined to raise the water supply tank with respect to the humidifying water reservoir in the sixth embodiment.
Figure 23:
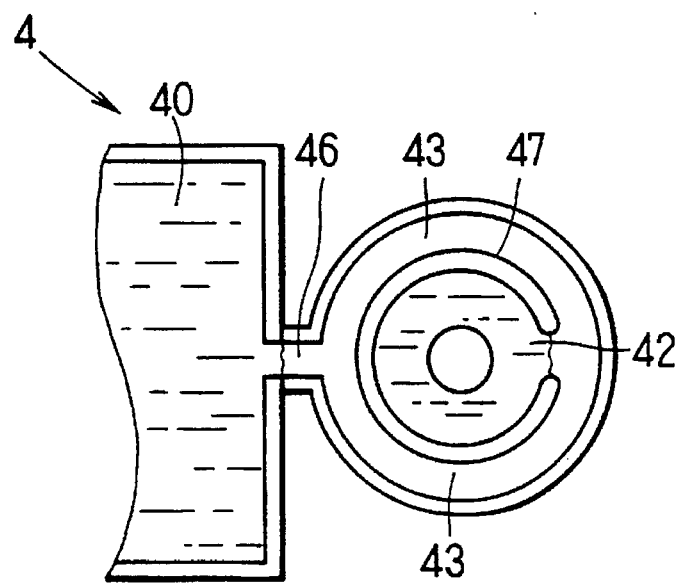
FIG. 23 is a top plan view of the state in which the water supply tank is removed in the state of FIG. 22 in the sixth embodiment.

In FIGS. 20 to 23 showing a sixth embodiment: FIG. 20 is a sectional view of an essential portion of the atomizing means 4 when the vehicle is not inclined; FIG. 21 is a top plan view when the water supply tank 5 is removed in the state of FIG. 20; FIG. 22 is a sectional of an essential portion of the atomizing means 4 when the water supply tank 5 is raised with respect to the humidifying water reservoir 40; and FIG. 23 is a top plan view when the water supply tank 5 is removed in the state of FIG. 22.

In the turn water supply passage 41 of the present embodiment, in a water receiving tank 45 of the type (in which the water flown out of the water supply tank 5 is received by the water receiving tank 45 is fed from a water passage 46 disposed at the side of the humidifying water reservoir 40 to this water reservoir 40), as shown in FIGS. 18 and 19, there is disposed a turn water passage forming wall 47 which has a C-shaped section opened away from the humidifying water reservoir 40. This turn water passage forming wall 47 is formed inside thereof with the backward water passage 42 for guiding the water having flown out of the water supply tank 5, away from the humidifying water reservoir 40, and outside thereof with the forward water passage 43 for turning the water, which has been guided away from the humidifying water reservoir 40 by the backward water passage 42, into the humidifying water reservoir 40.

Thus, the operation of the present embodiment having the turn water passage 41 constructed by forming the turn water passage forming wall 47 in the water receiving tank 45 is similar to that of the fifth embodiment. In case the vehicle is inclined to raise the water supply tank 5 with respect to the humidifying water reservoir 40, the backward water passage 42 is raised at its side away from the humidifying water reservoir 40, as shown in FIGS. 22 and 23, to interrupt the water flow between the backward water passage 42 and the forward water passage 43 and to clog the opening of the water supply tank 5 with the water in the backward water passage 42, thereby to obstruct the flow of the water out of the water supply tank 5.

As a result, even if the water supply tank 5 rises with respect to the humidifying water reservoir 40, the trouble of increasing the water content in the humidifying water reservoir 40 can be prevented to hold the water of the humidifying water reservoir 40 at the proper level H.

Seventh Embodiment

Figure 24:
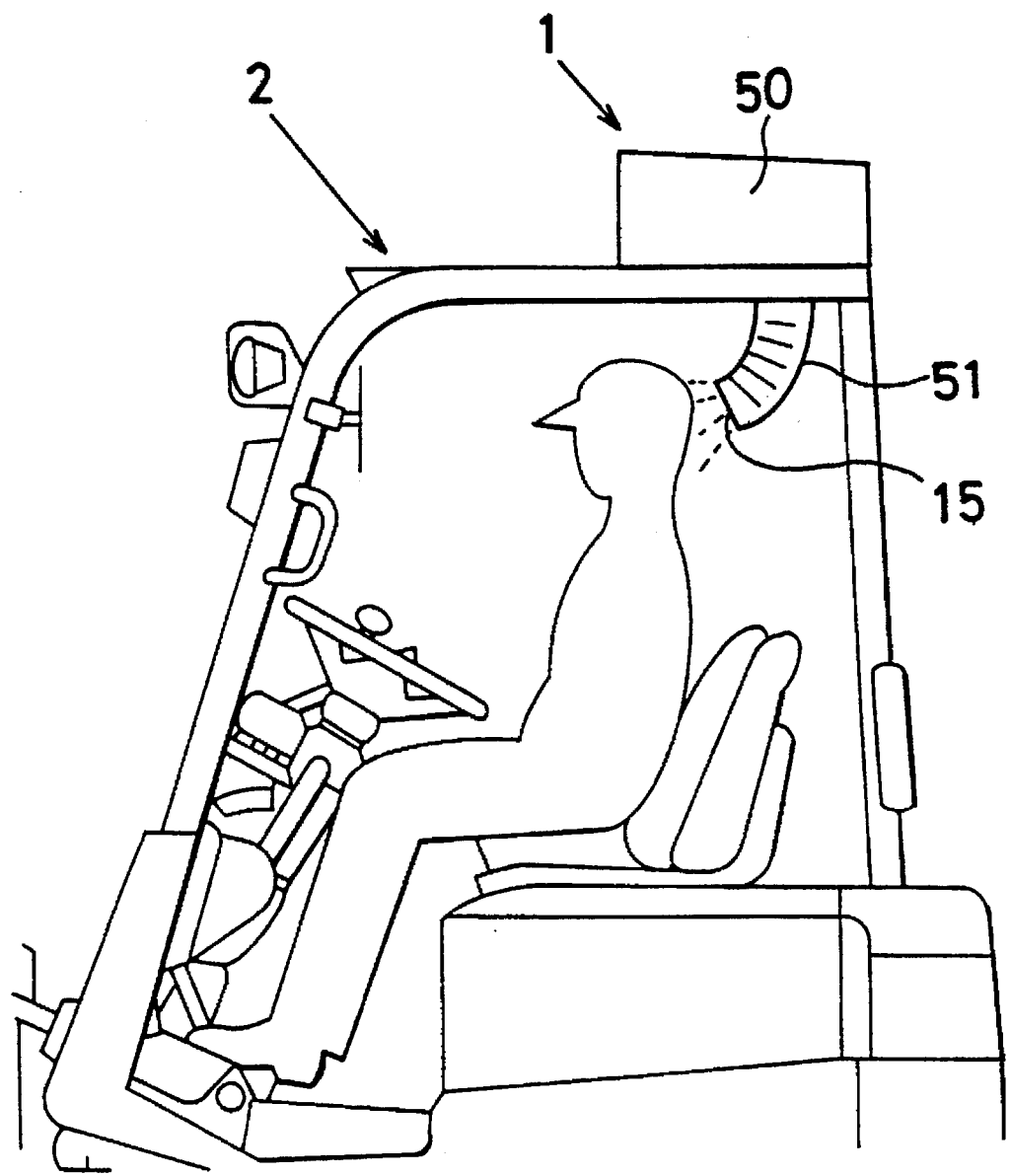
FIG. 24 is an explanatory view showing the state in which the vehicular humidified cool wind system is mounted in a seventh embodiment.

FIG. 24 is an explanatory diagram showing a seventh embodiment in which the vehicular humidified cool wind system 1 is mounted.

In the vehicular humidified cool wind system 1 of the present embodiment, the air outlet 15 of a humidifier body 50 is arranged at the back of the head of the driver through a duct 51 so that the humidified wind supplied from the above may be blown out toward the head back and the neck of the driver.

Since the air outlet is disposed at the back of the driver by the duct 51 in accordance with the present embodiment, none of the air outlet 15, the fog of the humidified wind blown out of the air outlet and the duct 51 comes into the field of view of the driver. As a result, the air outlet 15, the fog of the humidified wind blown out of the air outlet and the duct 51 raise no obstruction against the operation of the vehicle to bring about an excellent operability.

Since, moreover, the air outlet 15 can be brought closer to the driver 15 by the duct 51 while being out of the view field of the driver, the humidified wind can be efficiently blown from the air outlet 15 to the driver with an improvement in the cool feeling for the driver.

[Modification]

The foregoing embodiments are equipped with the lefthand ultrasonic atomizer for the lefthand air passage and the righthand ultrasonic atomizer for the righthand air passage. However, the atomized water prepared by one ultrasonic atomizer may be supplied to both the lefthand and righthand air passages.

The foregoing embodiments are exemplified by arranging the two air outlets individually above the lefthand and righthand sides before the face of the driver, but a plurality of air outlets may be disposed at each of the upper lefthand and righthand sides. Alternatively, one air outlet may be formed only at one of the upper lefthand and righthand sides or in the upper position in front of the driver.

In the foregoing embodiments, the ordinary wind is exemplified by the air flow which is produced by the blower and guided as it is toward the driver. In the ordinary wind passage, however, there may be provided means (as exemplified by cooling means or heating means) for changing the temperature of the air.

In the foregoing embodiments, there may be provided in the humidified wind passage means (as exemplified by cooling means or heating means) for changing the temperature of the air.

In the foregoing embodiments, the ordinary wind and the humidified wind are combined and blown toward the driver. However, the ordinary wind passage may be eliminated to blow only the humidified wind. In short, there may be adopted the mixed blowing type, as exemplified in the first embodiment.

In the foregoing embodiments, the downward guide passage has its opening formed in the bottom portion of the atomizing chamber and formed therearound with the weir so that the condensed water in the atomizing chamber may not flow into the opening. However, the opening may be formed in the side of the atomizing chamber and apart from the bottom portion of the same, to prevent the condensed water from stealing out of the atomizing chamber into the opening.

What is claimed is:

1. A humidified cool wind system for vehicles, comprising:

an air passage arranged over a driver for passing air therethrough, said air passage having a downwardly directed air outlet for blowing out the air from above the driver toward the driver;

a blower for producing an air flow from said air outlet toward the driver; and atomizing means for atomizing water to produce the atomized water in said air passage, wherein said air passage includes a humidified wind passage to be fed with the air and the atomized water atomized by said atomizing means and an ordinary wind passage to be fed with an ordinary wind containing no atomized water, said air outlet includes an internal cylinder for blowing out the humidified wind passing through said humidified wind passage and an external cylinder for blowing out the ordinary wind passing through said ordinary wind passage from around said internal cylinder.

2. A humidified cool wind system for vehicles according to claim 1, wherein said air outlet is disposed in a position before and above the face of the driver.

3. A humidified cool wind system for vehicles according to claim 1, wherein said air outlet is disposed in a position before and above, and at the lefthand and righthand sides of the face of the driver.

4. A humidified cool wind system for vehicles according to claim 1, further comprising evaporating members arranged around said internal cylinder, having communication with said internal cylinder for absorbing condensed water in said internal cylinder to evaporate the absorbed condensed water with the ordinary wind flowing in said external cylinder.

5. A humidified cool wind system for vehicles according to claim 1, wherein said internal cylinder is made of a flexible tube which is deformable in a normal direction with respect to the flow direction of the humidified wind, said external cylinder is made of a flexible duct which is deformable in a normal direction with respect to the flow direction of the ordinary wind and holds its deformed state, said external cylinder has a holding portion for holding said internal cylinder at an exit end, said holding portion is movable along the flow direction of the air with respect to said internal cylinder.

6. A humidified cool wind system for vehicles according to claim 1, wherein said humidified wind passage includes an atomizing chamber for guiding the humidified wind in a horizontal direction and a downward guide passage for guiding the humidified wind from said atomizing chamber into said internal cylinder disposed downward, and wherein around an opening for guiding the humidified wind from said atomizing chamber to said downward guide passage, a weir which is erected from the bottom portion of said atomizing chamber for preventing the condensed water condensed in said atomizing chamber from being guided into said downward guide passage.

7. A vehicular humidified cool wind system according to claim 1, wherein said atomizing means includes a water supply tank for supplying water, a humidifying water reservoir to be supplied with the water from said water supply tank, an ultrasonic oscillator for producing ultrasonic waves to focus in the vicinity of the liquid level of said humidifying water reservoir, and a turn water passage including a backward water passage for guiding the water flown out of said water supply tank in a opposite direction of said humidifying water reservoir, and a forward water passage for guiding the water in a direction of said humidifying water reservoir which is guided once in a opposite direction of said humidifying water reservoir.

8. A vehicular humidified cool wind system according to claim 1, wherein said air outlet is arranged at the back of the head of the driver.

9. A humidified cool wind system for vehicles, comprising:

a casing disposed over a driver;

a blower disposed in said casing for generating a flow of air;

atomizing means disposed in said casing for generating atomized water;

a humidified wind passage disposed downstream of said casing for leading the air and the atomized water atomized by said atomizing means;

an ordinary wind passage disposed downstream of said casing for leading the air containing no atomized water, an internal cylinder connected to said humidified wind passage for blowing out the air and the atomized water from said humidified wind passage simultaneously;

an external cylinder for blowing out the air from said ordinary wind passage, said external cylinder connected to said ordinary wind passage and disposed around said internal cylinder to cover an outer periphery of said internal cylinder so that the air including the atomized water reaches the driver without dispersing with being surrounded by the air from said ordinary wind passage.

10. A humidified cool wind system for vehicles according to claim 9, further comprising evaporating members is disposed in said external cylinder, said evaporating members having a leading means for leading condensed water from said internal cylinder to evaporate the absorbed condensed water with the air flowing in said external cylinder.

* * * * *